Feb. 7, 1928. 1,658,266
F. A. TICE
SUSPENDING DEVICE FOR TROLLEY WIRES
Filed Nov. 3, 1925
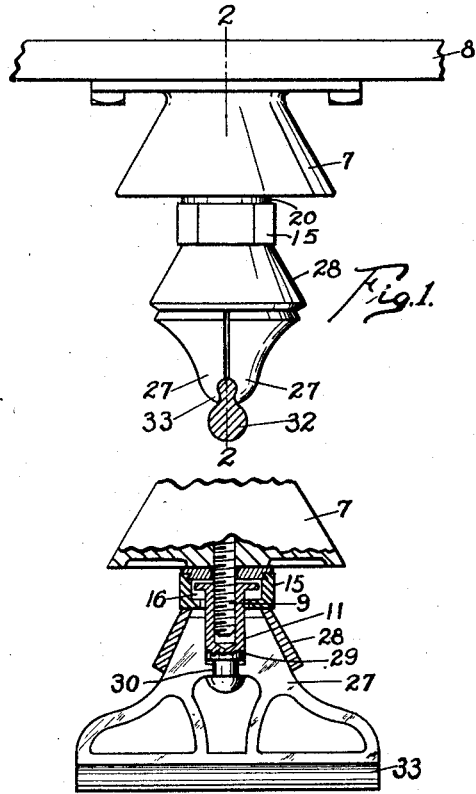
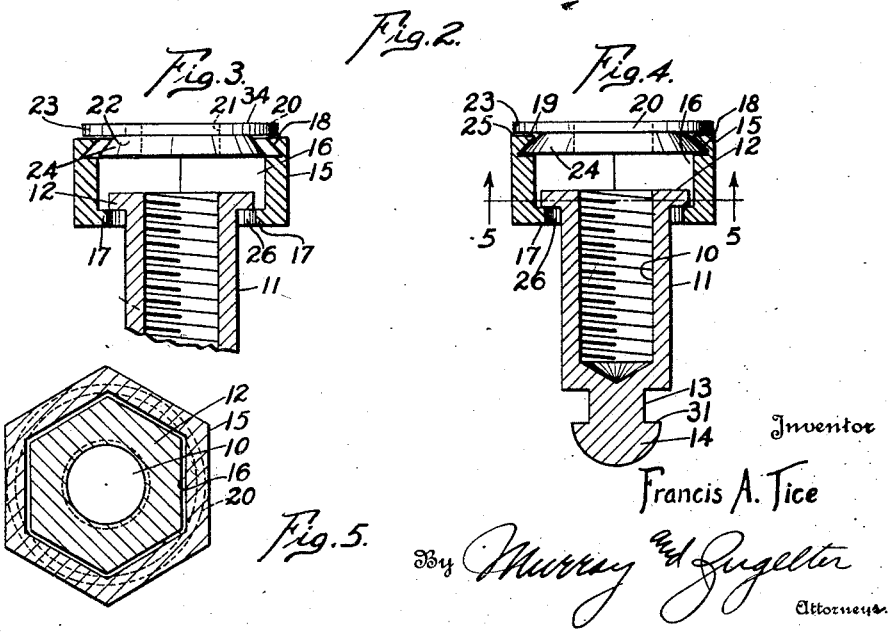
Inventor
Francis A. Tice
By Murray and Gugelter
Attorneys Patented Feb. 7, 1928.

1,658,266

UNITED STATES PATENT OFFICE.

FRANCIS A. TICE, OF CINCINNATI, OHIO, ASSIGNOR TO THE ELECTRIC RAILWAY EQUIPMENT COMPANY, OF CINCINNATI, OHIO, A CORPORATION OF OHIO.

SUSPENDING DEVICE FOR TROLLEY WIRES.

Application filed November 3, 1925. Serial No. 66,606.

An object of my invention is to provide a suspending device for trolley wires which is capable of rigid mounting upon a suitable insulating hanger in such manner as to preclude abrasion and destruction of the insulating hanger by reason of the vibration of the wires and suspending devices.

Another object is to provide a device of this kind which eliminates the necessity for providing a metal bearing face on the insulation of a suspending hanger.

Another object is to provide a device of this kind which takes the form of a complete unit so that one workman is able to make a complete installation of the trolley wire.

Another object is to provide a device of this kind which may be conveniently mounted with a minimum of time and effort and by reason of its unit form cannot be improperly mounted.

Another object is to provide a device of this kind which is adapted to be disposed at substantially any angle with relation to its hanger and which may be rigidly secured in any of its positions.

These and other objects are attained by the means described herein and disclosed in the accompanying drawings, in which:

Fig. 1 is an end elevational view of a device of my invention, mounted upon an insulating hanger.

Fig. 2 is a view taken on line 2—2 of Fig. 1.

Fig. 3 is a fragmental cross sectional view of parts of the device of my invention in position prior to completion.

Fig. 4 is a view of the same parts showing their relative positions in the completed article.

Fig. 5 is a cross sectional view taken on line 5—5 of Fig. 4.

The insulating hanger 7 is suspended from support 8 and carries a depending threaded stud 9. The stud 9 is adapted to engage in a threaded axial bore 10 of the stem 11. The stem 11 carries a flanged head 12, angular in cross section, for example hexagonal as shown in Fig. 5. The lower end of the stem is provided adjacent its end with an annular groove 13 whereby there is provided a knob 14 at the extreme lower end of the stem. A collar 15 of a shape similar to the head 12 of the stem, is provided with a recess 16 into which the head 12 of the stem has a loose sliding fit. The walls of the recess 16 conform substantially to the sides of the head 12 so that rotation of the collar 15 may impart rotation to the stem 11. The lower end of the collar 15 is provided with an inwardly extending flange 17 which precludes removal of the head 12 from the recess 16. Adjacent the opposite or upper side of the collar 15, there is provided an annular groove 18 whereby a flange 19 is provided at the edge of the collar. An abutment plate or washer 20 has a bore 21 extending therethrough of such diameter as to receive the threaded depending stud 9, on the hanger. A peripheral groove 22 in abutment plate 20 divides the edge of the said abutment plate into a pair of spaced flanges 23 and 24, the latter of which seats and is freely rotatable in the annular groove 18 of the collar 12, while the flange 23, being of greater diameter, extends over a substantial portion of the free top edge 25 of the collar. By reference to Figs. 2 and 4, it will be apparent that the head 12 of the stem is capable of a limited reciprocation, but is not rotatable in the collar 15, while the abutment plate or washer 20 is capable of free rotation in the annular groove in the collar but cannot be reciprocated with relation thereto. The disclosure in Fig. 3 shows the parts referred to before they are assembled, as shown in Fig. 4. The collar 15 is originally formed with the walls of the recess 16 so spaced as to permit the flange 24 to be lowered into a position in alignment with the annular groove 18. The head 12 is at this time also free to pass through a perforation 26 bounded by the inwardly extending flange 17 of the collar. The parts, positioned as in Fig. 3, are placed in a swaging machine and the collar 15 is swaged inwardly until the flange 24 of abutment plate 20 enters the annular groove 18. This swaging operation also reduces the diameter of the reduced bore 26 in the lower side of the collar so that the flanges 17 are disposed beneath the head 12 of the stem 11. It should be noted that the swaging operation is not performed until the holding ears 27 and compression ring 28 have first been positioned about the stem 11, as shown in Figs. 1 and 2. The details of construction and operation of the holding ears and compression ring may be of any suitable design, for example as shown in United States Letters Patent No. 1,549,363, issued to Lynn Johnston. These parts are disclosed in Figs. 1 and 2 and are sufficiently described for the purpose of this invention by calling attention to the fact that a pair of complementary ears 27 are provided with semicircular vertical grooves 29 for receiving the body of the stem 11 and that semicircular flanges 30 at the base of the semicircular grooves 29 extend into the annular groove 13 at the base of the stem so that the face 31 of the knob or head 15 serves to support the holding ears. The holding ears together assume the form of a truncated cone at their top portions which seats in the compression ring 28 having a tapered bore complementary to the conical portion of the holding ears so that when the stem 11 is screwed upwardly to bring the collar 15 into abutment with a given surface, the ears will be pressed toward one another for clamping a trolley wire 32 between the grooves 33 of the holding ears.

The present invention is directed to the provision of a unitary device provided with suitable self-contained means for precluding abrasion of insulating hangers such as 7.

The operation and advantages of the device are as follows:

The devices are assembled at the factory as shown in Fig. 2 with the collar swaged about the head of the stem and about the abutment plate 20 and with the holding ears loosely positioned about the stem with the compression collar 28 surrounding them. When a workman is detailed to put up a trolley wire in a mine or elsewhere, he would first put up a series of hangers 7, fastening them to supports such as 8 upon the roof of a tunnel after which he would take a supply of the supporting units and fasten one upon each of the depending studs 9 on the hangers. This mounting can only be accomplished in one way so that it is impossible for a workman, however careless he may be, to improperly mount the devices or to neglect to install any portion thereof. To mount the devices, the stud 9 is caused to enter the bore 21 in abutment plate 20, pass through the recess 16 in the collar and into the threaded axial bore 10 of the stem. The collar 15 is then rotated to engage a few threads on stem 11 upon the stud 9 so that the device is retained thereon. A series of devices thus mounted are ready to receive the trolley wire 32. The wire 32 is inserted between the grooves 33 of the holding ears which at this time are capable of separation and also of free rotatary movement as a unit, in order to permit alignment of the grooves 33 with the direction of the wire. After the wire is inserted in the grooves 33 and the ears are disposed in proper alignment, the collar 15 is then rotated, drawing the sleeve 11 and the head 14 thereof upwardly thereby raising the ears 27 and causing compression ring 28 to bind them tightly upon the wire. Further movement causes the compression ring to raise the collar 15 which carries the freely rotatable abutment plate 20 into binding abutment with the base of the insulating hanger 7. Further rotation of the collar will cause the collar to move relatively to the abutment plate so that it is impossible for a workman to destroy or chew away the insulation because the comparatively sharp edges of the collar cannot contact the body of the hanger and because no further rotatory movement can be imparted to the abutment plate. It will also be noted that in use, the usual vibration of the trolley wires and suspending devices will be taken up by a comparatively large area of the abutment plate without any derogatory effect upon the insulating hanger. It will also be apparent that in addition to being incapable of improper mounting, there is also eliminated the possibility of a loss of parts and the waste of time and money in delay of procuring the said parts when the workman and material are on a job.

What I claim is:

1. In a device of the class described the combination of holding ears for receiving and clamping a trolley wire, means for retaining the ears in position, a stem rotatably mounted between the ears and upon which the ears are suspended, a collar supporting one end of the stem and adapted to impart rotation to the stem when the collar is turned, and an abutment plate revolubly secured on the collar and having a portion extending beyond the edge of said collar, movement of the collar in one direction serving to bring the retaining means into operative position upon the ears.

2. In a device of the class described the combination of means for receiving and clamping a trolley wire, a stem for supporting the clamping means, a collar supporting one end of the stem and serving to rotate said stem in the clamping means and an abutment plate having an annular groove for revolubly retaining the collar against separation from said abutment plate.

3. In a device of the class described the combination with an insulating support having a depending threaded stud, of an internally threaded stem for receiving the stud, holding ears revolubly supported upon the stem, retaining means for clamping said ears on the stem, a collar carried by one end of the stem and adapted to impart rotation thereto for mounting the stem upon the depending stud, and an abutment plate adapted to receive the depending stud and revolubly secured upon and extending above the collar whereby the abutment plate is moved into abutment with the insulating support when the stem is moved upwardly of the depending stud for securing the device upon the support.

4. In a device of the class described the combination with a threaded stud having insulating material radiating therefrom, of a stem having threaded engagement on the stud, a wire receiving and clamping means rotatably supported upon the stem, a collar for rotating the stem on the threaded stud and adapted to be moved toward the insulating material as the stem is rotated, and abutment means rotatably secured to the collar and disposed intermediate the collar and insulating material.

5. In a device of the class described the combination with a stud having insulating material radiating therefrom, of a stem threadedly mounted on the stud, wire holding means rotatably supported by the stem, a collar arranged for joint movement with the stem for moving said collar and stem upwardly of the stud toward the insulating material, and abutment means rotatably mounted in the collar and having a portion disposed between the collar and insulating material.

6. The combination with contractible means for receiving a cable of rotatable means for actuating the contractible means to clamp and to release a cable and an abutment plate rotatably connected with the rotatable means whereby said rotatable means may be actuated without rotatably actuating the abutment plate.

In testimony whereof, I have hereunto subscribed my name this 30th day of October, 1925.

FRANCIS A. TICE.